United States Patent [19]

Davis et al.

[11] Patent Number: 4,502,972
[45] Date of Patent: Mar. 5, 1985

[54] LUBRICATING OIL COMPOSITION CONTAINING A DIALKYL DITHIOCARBAMATE-MODIFIED EPDM VISCOSITY INDEX IMPROVER

[75] Inventors: Bryan T. Davis, Baton Rouge, La.; Jackson C. Chen, Brea, Calif.

[73] Assignee: Ethyl Corporation, Richmond, Va.

[21] Appl. No.: 392,288

[22] Filed: Jun. 25, 1982

[51] Int. Cl.³ .............................................. C10M 1/38
[52] U.S. Cl. .................................. 252/47; 525/331.8; 525/333.9
[58] Field of Search ............. 252/47; 525/331.8, 333.9

[56] References Cited

U.S. PATENT DOCUMENTS

| | | |
|---|---|---|
| 2,599,350 | 6/1952 | Rudel et al. ..................... 252/47 X |
| 3,249,542 | 5/1966 | Barry ................................ 252/47 X |
| 3,379,701 | 4/1968 | Gladding et al. ................ 525/331.8 |
| 3,853,775 | 12/1974 | Williams ......................... 252/47 X |
| 4,207,196 | 6/1980 | Sudekum ......................... 252/47 X |
| 4,303,539 | 12/1981 | Song .................................. 252/47 |

FOREIGN PATENT DOCUMENTS 1468264 3/1977 United Kingdom .

*Primary Examiner*—Andrew Metz
*Attorney, Agent, or Firm*—Donald L. Johnson; John F. Sieberth; W. G. Montgomery

[57] ABSTRACT

The viscosity index and wear inhibiting properties of lubricating oil are improved by adding an effective amount of a 20,000–300,000 molecular weight olefin copolymer to which are grafted di-$C_{1-20}$ alkyl dithiocarbamate groups.

6 Claims, No Drawings

LUBRICATING OIL COMPOSITION CONTAINING A DIALKYL DITHIOCARBAMATE-MODIFIED EPDM VISCOSITY INDEX IMPROVER

BACKGROUND

Lubricating oil compositions used in an engine crankcase generally contain a zinc dialkyldithiophosphate additive to reduce engine wear. Unfortunately, it has been found that this use imparts certain phosphorus combustion products to the engine exhaust. These products can deactivate the exhaust gas catalyst used in most cars. Therefore, there is a need to reduce the amount of zinc dialkyldithiophosphate additive in engine oil but still retain adequate wear protection.

British Pat. No. 1,468,264 describes sulfurized additives made by reacting dialkyldithiocarbamate salts with relatively low molecular weight chlorinated polybutenes. Such additives do not offer any improvement in viscosity index.

Viscosity index is the ability of an oil to resist excessive loss of viscosity at elevated temperatures while still not being too viscous at lower temperatures. To improve this property, viscosity index improvers are conventionally added to motor oil. One class of viscosity index improvers are the olefin copolymers, especially copolymers of ethylene, propylene and a diene such as 1,4-hexadiene and/or vinylnorbornene.

SUMMARY

According to the present invention, the wear inhibiting properties of lubricating oil are improved by use of a non-phosphorus additive which also functions as a viscosity index improver. The new additive has an olefin copolymer backbone to which are bonded one or more dialkyldithiocarbamate groups.

DESCRIPTION OF THE PREFERRED EMBODIMENTS

A preferred embodiment of the invention is a viscosity index improving additive having wear inhibiting properties, said additive comprising a polymeric backbone containing ethylene, propylene, and non-conjugated diene units to which is bonded a di-$C_{1-20}$ alkyl dithiocarbamate group, said polymeric backbone having a molecular weight of about 20,000 to about 300,000.

Ethylene-propylene-non-conjugated diene copolymers that can be used to make the additives of this invention can be obtained commercially. Their composition and preparation are described in a number of patents such as U.S. Pat. Nos. 3,551,336, 3,598,738 and 3,790,480, all of which are incorporated herein by reference for their disclosure of olefin copolymers.

The preferred olefin copolymer is a copolymer of ethylene, propylene and 1,4-hexadiene and or vinyl norbornene having a ($\overline{M}_n$) molecular weight of about 20,000 to 300,000 and more preferably about 100,000 to 250,000. The preferred copolymer contains about 30 to 79 weight percent ethylene-derived units, 20 to 69 weight percent propylene-derived units and 1 to 10 weight percent diene-derived units.

The di-$C_{1-20}$ alkyl dithiocarbamate groups which are bonded to the olefin copolymer backbone have the structure

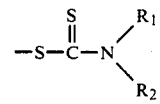

wherein $R_1$ and $R_2$ are independently selected from alkyl groups containing 1 to about 20 carbon atoms. Examples of these are dimethyl dithiocarbamate, diethyl dithiocarbamate, diisobutyl dithiocarbamate, di-n-butyl dithiocarbamate, di-(2-ethylhexyl) dithiocarbamate, didodecyldithiocarbamate, di-n-octyl dithiocarbamate, di-sec-eicosyl dithiocarbamate, methyl ethyl dithiocarbamate, methyl n-butyl dithiocarbamate, methyl isobutyl dithiocarbamate, ethyl isobutyl dithiocarbamate, ethyl 2-ethylhexyl dithiocarbamate, and the like.

The additives can be made by the process of reacting a halogen (e.g. chlorine or bromine) with the olefin copolymer to form a halogen substituted copolymer and then reacting this with an alkali metal di-$C_{1-20}$ alkyl dithiocarbamate. The preferred halogen is chlorine and the preferred alkali metal is sodium.

The halogenation of the olefin copolymer is preferably conducted in an inert solvent because the copolymers are rubbery solids. Suitable solvents include aliphatic hydrocarbons (e.g. isooctane, kerosene, etc.), alkyl halides (e.g. chloroform, carbon tetrachloride, etc.), chlorinated aromatics (e.g. chlorobenzene, dichlorobenzene, dichloroxylene, etc.) and the like. The preferred solvent is mineral oil which can be left in the product. The olefin copolymer is dissolved in the mineral oil to form a solution containing about 3–15 weight percent copolymer and preferably about 5–10 weight percent copolymer. Solvation requires stirring for several hours at an elevated temperature, preferably under an inert atmosphere.

Following solvation, the halogen is injected into the solution at about 20°–200° C. Chlorine reacts nicely at about 20°–100° C., more preferably about 30°–60° C.

The amount of halogen can vary over a wide range. A useful range in which to operate is about 50 to 300 grams of halogen per kg of copolymer in the solution.

Following the halogenation, it is preferred to remove unreacted halogenated other by-products of the halogenation. This can be accomplished by standard means such as by heating the oil solution (e.g. 50°–150° C.) under reduced pressure (e.g. 5–50 mm. Hg). The resulting halogenated olefin polymer usually contains about 5 to about 25 weight percent halogen.

The oil solution of the halogenated olefin copolymer is then reacted with an alkali metal dialkyl dithiocarbamate such as sodium or potassium dialkyl dithiocarbamate. This reaction can be conducted by mixing the mineral oil solution of the halogenated olefin copolymer with a polar solvent such as alcohol, dimethyl formamide, dimethyl sulfoxide, ketones, esters, water, and the like. Good results have been attained using a lower alcohol solvent such as ethanol. Similar results would be expected with lower alcohols containing 1 to about 6 carbon atoms such as methanol, isobutanol, isopropanol, 2-ethylhexanol, and the like.

The amount of polar solvent should be enough to dissolve the mineral oil solution of halogenated olefin copolymer. A recommended range is about 1 to 5 parts by volume of polar solvent for each part by volume of oil solution.

The alkali metal di-$C_{1-20}$ alkyl dithiocarbamate is added to the polar solvent reaction mixture and stirred at reaction temperature. This temperature should be high enough to cause the reaction of the alkali metal dialkyl dithiocarbamate with the halogen bonded to the olefin copolymer forming alkyl metal halides and bonding dialkyl dithiocarbamate groups to the olefin copolymer backbone. A useful temperature range is about 50°–200° C. At temperatures above the boiling point of the solvent, the reaction should be conducted in a sealed pressure vessel. A preferred temperature range is about 50° C. up to the atmospheric reflux temperature of the reaction mixture. Using an ethanol solvent, good results were obtained at about 80° C.

The reaction should be conducted for a period of time sufficient to substantially complete the replacement of halogen with dialkyl dithiocarbamate groups. This can vary from 1 to about 48 hours. A useful range is about 4–24 hours.

The replacement of halogen with dialkyl dithiocarbamate groups is promoted by adding a small amount of a base such as an alkaline earth metal carbonate. Good results were obtained using about 1 to 10 parts by weight of calcium carbonate for each 100 parts of reaction mixture.

The reaction mixture can be water-washed if desired but this is not necessary. Preferably, the reaction mixture is merely stripped of volatiles such as the polar co-solvent by heating (e.g. 50°–200° C.) under reduced pressure (e.g. 10–100 mm Hg). Insoluble solids (e.g. NaCl, CaCO$_3$, and the like) can be removed by filtration leaving a bright clear oil solution of an olefin copolymer substituted with di-$C_{1-20}$ alkyl dithiocarbamate groups.

The following example illustrates the preparation of a typical additive.

EXAMPLE 1

In a stirred reaction vessel was placed 1900 grams of hydro-treated 80 neutral oil, 100 grams of pieces of an ethylene-propylene-vinyl norbornene EPDM rubber having M$_w$ molecular weight of 240,000 (Polysar EPDM-585 Trademark). This was stirred under nitrogen at 230° C. for four hours to dissolve the rubber. A few crystals of iodine were added and chlorine was injected at 30°–60° C. until the iodine color turned yellow (about two hours). Vacuum was then applied and the oil solution stripped at 60° C. 20 mm. Hg for one hour.

In a second reaction vessel was placed 100 ml. of ethanol, 40 grams of the above oil solution, 5 grams of calcium carbonate and 2.09 grams of sodium dimethyl dithiocarbamate. This mixture was stirred for 24 hours at 80° C. Then 160 grams of the hydro-treated 80 neutral oil were added to form a more dilute solution, and volatiles were stripped at 100° C. 20 mm. Hg for one hour. The resultant oil solution was then filtered, yielding 200 grams of an oil solution containing about 1 weight percent of dimethyl dithiocarbamate-substituted olefin copolymer.

Other additives of the invention can be made following the above general procedure by substituting other olefin copolymers, bromine and/or alkali metal di-$C_{1-20}$ alkyl dithiocarbamates. Likewise, other sulfur-containing anions may be grafted to the olefin copolymer backbone by reacting various sulfur compounds with the chlorinated olefin copolymer. These products are also candidate wear inhibiting additives which combine viscosity index improving properties. Such sulfur compounds include alkali metal alkylxanthates having the formula

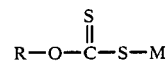

wherein R is an alkyl containing about 1–20 carbon atoms and M is an alkali metal. These sulfur-containing reactants can be represented by sodium methylxanthate, potassium ethylxanthate, sodium isobutylxanthate, sodium (2-ethylhexyl)xanthate, potassium dodecylxanthate, sodium octadecylxanthate, potassium eicosylxanthate, and the like. These react with the chlorinated olefin copolymer by forming alkali metal chloride and bonding the anion to the copolymer such that M is replaced by the copolymer backbone.

Another suitable grafted anion is O,O-dihydrocarbyldithiophosphate which can be bonded to the copolymer by reacting the chlorinated olefin copolymer with an alkali metal salt having the structure

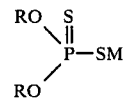

wherein R is an alkyl containing 1–20 carbon atoms, an aryl containing 6–12 carbon atoms or a cycloalkyl containing 5–8 carbon atoms and M is an alkali metal. These are exemplified by sodium dimethyldithiophosphate, sodium diisobutyldithiophosphate, sodium methyl 2-ethylhexyldithiophosphate, potassium diamyldithiophosphate, potassium didodecyldithiophosphate, sodium dicyclohexyldithiophosphate, potassium dicyclooctyldithiophosphate, potassium methyl cyclohexyldithiophosphate, sodium diphenyldithiophosphate, sodium diphenyldithiophosphate, potassium di-(p-tert-butylpehnyl)dithiophosphate, sodium methyl naphthyldithiophosphate, and the like.

Sulfur containing copolymers can also be obtained by reacting the chlorinated olefin copolymer with a dimercaptothiadiazole such as 2,5-dimercapto-1,3,4-thiadiazole, or its alkali metal salts.

Likewise, useful additives can also be made by reacting alkali metal sulfide (e.g. Na$_2$S) or alkali metal polysulfides (e.g Na$_2$S$_2$, Na$_2$S$_4$, Na$_2$S$_x$, and the like) with the chlorinated olefin copolymer.

Another possibility is the reaction of alkyl mercaptans or their alkali metal salts with the chlorinated olefin copolymer. Such compounds include methyl mercaptan, ethyl mercaptan, isobutyl mercaptan, tert-butyl mercaptan, 2-ethylhexyl mercaptan, dodecyl mercaptan, octadecyl mecaptan, eicosyl mercaptan, sodium methylmercaptide, sodium ethylmercaptide, potassium isobutylmercaptide, sodium 1-ethylhexylmercaptide, and the like.

Another useful graft copolymer can be made by substituting an alkali metal salt of mercaptobenzothiazole in above Example 1.

The additives are useful in a broad range of lubricating oils. They are used at a concentration which provides the desired amount of wear inhibition and viscosity lift. A useful concentration range is about 0.05–10 weight percent excluding any diluent such as process oil that might have been used in their preparation. A more preferred concentration range is about 0.5–5 weight percent. In most cases, an adequate amount of effectiveness is achieved at a concentration of about 1-3 weight percent.

The additives can be used in mineral oil or in synthetic oils of viscosity suitable for use in the crankcase of an internal combustion engine. Crankcase lubricating oils have a viscosity up to about 80 SUS at 210° F.

Crankcase lubricating oils of the present invention have a viscosity up to about SAE 50. Sometimes such motor oils are given a classification at both 0° and 210° F., such as SAE 10W 40 or SAE 5W 30.

Mineral oils include those of suitable viscosity refined from crude oil from sources including the Gulfcoast, midcontinent, Pennsylvania, mideast, California, Alaska, North Sea, and the like. Various standard refinery operations can be used in processing the mineral oil.

Synthetic oil includes both hydrocarbon synthetic oil and synthetic esters. Useful synthetic hydrocarbon oils include liquid polymers of α-olefins having the proper viscosity. Especially useful are the hydrogenated liquid oligomers of $C_{6-12}$ α-olefins such as α-decene trimer. Likewise, alkylbenzenes of proper viscosity can be used, such as didodecylbenzene.

Useful synthetic esters include the esters of both monocarboxylic acid and polycarboxylic acid as well as monohydroxy alkanols and polyols. Typical examples are didodecyl adipate, trimethylol propane tripelargonate, pentaerythritol tetracaproate, di-(ethylhexyl)adipate, dilauryl sebacate, and the like. Complex esters prepared from mixtures of mono- and dicarboxylic acid and mono- and polyhydroxyl alkanols can also be used.

Blends of mineral oil with synthetic oil are particularly useful. For example, blends of 10-25 weight percent hydrogenated α-decene trimer with 75-90 weight percent 150 SUS (100° F.) mineral oil results in an excellent lubricant. Likewise, blends of about 10-25 weight percent di-(2-ethylhexyl) adipate with mineral oil of proper viscosity results in a superior lubricating oil. Also, blends of synthetic hydrocarbon oil with synthetic esters can be used. Blends of mineral oil with synthetic oil are especially useful when preparing low viscosity oil (e.g. SAE 5W 20) since they permit these low viscosities without contributing excessive volatility.

The lubricating oil compositions can include zinc dihydrocarbyldithiophosphate (ZDDP) in combination with the present additives. Generally, the amount of ZDDP can be reduced due to the added wear inhibition provided by the present additives. Both zinc dialkyldithiophosphates and zinc dialkaryldithiophosphates as well as mixed alkyl-aryl ZDDP are useful. A typical alkyl-type ZDDP contains a mixture of isobutyl and isoamyl groups. Zinc di-(nonylphenyl)dithiophosphate is a typical aryl-type ZDDP. Good results are achieved using sufficient ZDDP to provide about 0.1-0.5 weight percent zinc. A preferred concentration supplies about 0.025-0.3 weight percent zinc.

Another additive used in the oil compositions is the alkaline earth metal petroleum sulfonates or alkaline earth metal alkaryl sulfonates. Examples of these are calcium petroleum sulfonates, magnesium petroleum sulfonates, barium alkaryl sulfonates, calcium alkaryl sulfonates or magnesium alkaryl sulfonates. Both the neutral and the overbased sulfonates having base numbers up to about 400 can be beneficially used. These are used in an amount to provide about 0.05-1.5 weight percent alkaline earth metal and more preferably about 0.1-1.0 weight percent. In a most preferred embodiment, the lubricating oil composition contains a calcium and/or magnesium petroleum sulfonate or alkaryl (e.g. alkylbenzene)sulfonate.

Other viscosity index improvers can be included such as the polyalkylmethacrylate type or the ethylene-propylene or ethylene-propylenediene copolymer type. Likewise, styrene-diene VI improvers or styreneacrylate copolymers can be used. Alkaline earth metal salts of phosphosulfurized polyisobutylene are useful.

The present additives are effective viscosity index improvers. They can be used to partially or totally replace the conventional viscosity index improver.

The 80N mineral oil containing 1 weight percent of the new dithiocarbamate grafted olefin copolymer had a viscosity index of 176 compared to a viscosity index of 97 for the same 80N mineral oil without the new additive.

Further tests were conducted to determine the wear inhibition properties of the new additive. The test used was the standard four-ball wear test in which one ball is rotated at 1000 RPM in the center of three fixed balls arranged in a triangle such that the rotating ball wears against one spot on each of the fixed balls. The balls are immersed in test lubricant at 54° C. with a load of 20 kg on the rotating ball. The average scar diagram on the three fixed balls is the measure of the wear inhibition. The additives was tested along and in combination with a commercial ZDDP. The results are shown on the following table.

TABLE I

|   | Additive | Conc (wt. %) | Scar Dia (mm.) |
|---|---|---|---|
| 1. | None |  | 0.95 |
| 2. | Example 1 | 1.0[1] | 0.58 |
| 3. | Example 1 ZDDP | 1.0 0.5 | 0.44 |
| 4. | Example 1 ZDDP | 1.0 0.25 | 0.51 |

[1]On active basis of polymer content

The results show a substantial reduction in wear due to the presence of the new additives. Thus, the new additives retain the viscosity increase effect of the original olefin copolymer and gain the additional property of inhibiting wear.

We claim:

1. A viscosity index improving additive having wear inhibiting properties, said additive comprising a polymeric backbone containing ethylene, propylene and non-conjugated diene units to which is bonded a di-$C_{1-20}$ alkyl dithiocarbamate group, said additive being made by the process of reacting a halogen with a copolymer of ethylene, propylene and a non-conjugated diene to form a halogen-substituted copolymer, said copolymer having an average molecular weight of about 20,000 to 300,000 and then reacting said halogen-substituted copolymer with an alkali metal di-$C_{1-20}$ alkyl dithiocarbamate.

2. An additive of claim 1 wherein said halogen is chlorine.

3. An additive of claim 2 wherein said alkali metal is sodium.

4. An additive of claim 2 wherein said dithiocarbamate group is dimethyl dithiocarbamate.

5. A lubricating oil composition containing an amount of an additive of claim 1 which will increase the viscosity index of said oil and improve the wear inhibiting properties of said oil.

6. A lubricating oil composition containing an amount of an additive of claim 4 which will increase the viscosity index of said oil and improve the wear inhibiting property of said oil.

* * * * *